United States Patent
Choi et al.

(10) Patent No.: US 9,720,070 B2
(45) Date of Patent: Aug. 1, 2017

(54) COMMUNICATION DEVICE AND METHOD FOR CONTROLLING THE SAME

(71) Applicant: Samsung Electronics Co., Ltd., Gyeonggi-do (KR)

(72) Inventors: Jin-Won Choi, Gyeonggi-do (KR); Min-Goo Kim, Gyeonggi-do (KR); Chae-Hag Yi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/221,223

(22) Filed: Jul. 27, 2016

(65) Prior Publication Data

US 2017/0102447 A1    Apr. 13, 2017

(30) Foreign Application Priority Data

Oct. 8, 2015  (KR) .................. 10-2015-0141814

(51) Int. Cl.
*H04W 24/00* (2009.01)
*G01S 5/02* (2010.01)
*H04W 56/00* (2009.01)
*H04L 5/00* (2006.01)
*G01S 5/10* (2006.01)

(52) U.S. Cl.
CPC .......... *G01S 5/0252* (2013.01); *G01S 5/0236* (2013.01); *G01S 5/10* (2013.01); *H04L 5/005* (2013.01); *H04W 56/001* (2013.01); *H04W 56/005* (2013.01)

(58) Field of Classification Search
CPC ....... H04W 64/00; H04W 4/02; H04W 24/10; H04W 72/0446; H04W 72/0453; H04W 52/0206; H04W 56/00; H04W 56/001; H04W 64/003; G01S 5/10; G01S 5/0215; G01S 5/0221; G01S 5/06; H04L 27/2613; H04L 5/00

See application file for complete search history.

(56) References Cited

U.S. PATENT DOCUMENTS

| | | | |
|---|---|---|---|
| 8,909,271 B2 | 12/2014 | Stern-Berkowitz et al. | |
| 2012/0002740 A1 | 1/2012 | Han et al. | |
| 2015/0063195 A1 | 3/2015 | Han et al. | |
| 2016/0187458 A1* | 6/2016 | Shah | G01S 5/021 455/456.1 |
| 2016/0295374 A1* | 10/2016 | Persson | G01S 5/0036 |

FOREIGN PATENT DOCUMENTS

| | | |
|---|---|---|
| KR | 10-2010-0105824 | 9/2010 |
| KR | 10-2010-0113036 | 10/2010 |
| KR | 10-2012-0015851 | 2/2012 |

* cited by examiner

*Primary Examiner* — Kwasi Karikari
(74) *Attorney, Agent, or Firm* — The Farrell Law Firm, P.C.

(57) ABSTRACT

Methods and apparatuses are provided for controlling a communication device. A first subframe is received from a serving cell and a plurality of subframes is received from a plurality of neighbor cells. A respective time difference of arrival (TDOA) is measured for each of the plurality of subframes based on a time of arrival (TOA) of the first subframe. At least one of the measured TDOAs is transmitted to a location server. The respective TDOAs are measured based on at least one of a cell-specific reference signal (CRS) and a synchronization signal in the plurality of subframes.

19 Claims, 8 Drawing Sheets

COMMUNICATION DEVICE AND METHOD FOR CONTROLLING THE SAME

PRIORITY

This application claims priority under 35 U.S.C. §119(a) to a Korean Patent Application No. 10-2015-0141814, which was filed in the Korean Intellectual Property Office on Oct. 8, 2015, the content of which is incorporated herein by reference.

BACKGROUND

1. Field of the Disclosure

The present disclosure relates generally to a communication device and a method for controlling the same, and more particularly, to a communication device capable of providing information for estimating a position of a user based on various types of signals and a method for controlling the communication device.

2. Description of the Related Art

Methods for estimating a location of a user equipment (UE) may be based on a global positioning system (GPS) or terrestrial positioning. A position estimation method that is based on terrestrial positioning may be referred to as an observed time difference of arrival (OTDOA), an enhanced observed time difference (E-OTD), or an advanced forward link trilateration (AFLT), depending on the wireless communication system to which the position estimation method based is applied. For example, the OTDOA may include a method for determining a distance between cells according to a reference signal time difference (RSTD) measured based on a positioning reference signal (PRS) sent from a plurality of cells.

A transmission period of the PRS is a minimum of 160 ms, which is longer than that of other types of signals received from the base station, such as, for example, a transmission period (e.g., 1 ms) of a cell-specific reference signal or a transmission period (e.g., 5 ms) of a synchronization signal (e.g., a primary synchronization signal (PSS), a secondary synchronization signal (SSS), or the like). As such, a position of the UE is estimated based on the PRS having a relatively long period among the various signals received from the base station. As a result, in a high-speed moving environment, the current position of the UE may not be accurately estimated.

SUMMARY

An aspect of the present disclosure provides a method and a communication device for providing an accurate position estimation result for a UE by measuring a time difference of arrival (TDOA) based on signals having shorter transmission periods than a transmission period of a PRS.

According to an embodiment of the present disclosure, a communication device is provided that includes a transceiver, a memory electrically connected with the transceiver, and a processor electrically connected with the transceiver and the memory. The processor is configured to receive a first subframe from a serving cell and a plurality of subframes a plurality of neighbor cells. The processor is also configured to measure a respective TDOA for each of the plurality of subframes based on a time of arrival (TOA) of the first subframe. The processor is further configured to transmit at least one of the measured TDOAs to a location server. The respective TDOAs are measured based on at least one of a cell-specific reference signal (CRS) and a synchronization signal in the plurality of subframes.

According to an embodiment of the present disclosure, a method is provided for controlling a communication device. A first subframe is received from a serving cell and a plurality of subframes is received from a plurality of neighbor cells. A respective TDOA is measured for each of the plurality of subframes based on a TOA of the first subframe. At least one of the measured TDOAs is transmitted to a location server. The respective TDOAs are measured based on at least one of a CRS and a synchronization signal in the plurality of subframes.

According to an embodiment of the present disclosure, a UE is provided that includes a memory and a communication device electrically connected with the memory. The communication device includes a transceiver and a processor electrically connected with the transceiver. The processor is configured to receive a first subframe from a serving cell and a plurality of subframes from a plurality of neighbor cells. The processor is also configured to measure a respective TDOA for each of the plurality of subframes based on a TOA of the first subframe. The processor is further configured to transmit at least one of the measured TDOAs to a location server. The respective TDOAs are measured based on at least one of a CRS and a synchronization signal in the plurality of subframes.

According to an aspect of the present disclosure, a chip for communication is provided that is configured to receive a first subframe from a serving cell and a plurality of subframes from a plurality of neighbor cells. The chip is also configured to measure a respective TDOA for each of the plurality of subframes based on a TOA of the first subframe. The chip is further configured to transmit at least one of the measured TDOAs to a location server. The respective TDOAs are measured based on at least one of a CRS and a synchronization signal.

According to an aspect of the present disclosure, a method for controlling a communication device is provided. A transceiver of the communication device receives a first subframe from a serving cell. The transceiver receives a second subframe from a neighbor cell. The transceiver receives a third subframe from a second neighbor cell. A processor of the communication device measures a first TDOA between a first TOA of the first subframe and a second TOA of the second subframe. The processor measures a second TDOA between the first TOA and a third TOA of the third subframe. The transceiver transmits at least one of the first TDOA and the second TDOA to a location server. The first TDOA and the second TDOA are measured based on at least one of a CRS and a synchronization signal in one or more of the first, second, and third subframes.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

Herein, expressions such as "having," "may have," "comprising," and "may comprise" indicate the existence of a corresponding characteristic (e.g., an element such as a numerical value, function, operation, or component), and does not exclude the existence of one or more additional characteristics.

Herein, expressions such as "A or B," "at least one of A and B," and "one or more of A and B" may include all possible combinations of together listed items. For example, "A or B," "at least one of A and B," and "one or more of A and B" may indicate (1) at least one A, (2) at least one B, or (3) both at least one A and at least one B.

Expressions such as "first," "second," "primarily," or "secondary," as used herein, may represent various elements regardless of order and/or importance and do not limit the corresponding elements. The expressions may be used to distinguish one element from another element. For example, a first user device and a second user device may represent different user devices regardless of their order or importance. Additionally, a first element may be referred to as a second element without deviating from the scope of the present disclosure, and similarly, a second element may be referred to as a first element.

When it is described that an element (such as a first element) is "operatively or communicatively coupled" or "connected" to another element (such as a second element), the element can be directly connected to the other element or the element can be connected to the other element through a third element. However, when it is described that an element (such as the first element) is "directly connected" or "directly coupled" to another element (such as the second element), there is no intermediate element (such as the third element) between the element and the other element.

The expression "configured to (or set)", as used herein, may be replaced with, for example, "suitable for," "having the capacity to," "designed to," "adapted to," "made to," or "capable of" according to the situation. Additionally, the expression "configured to (or set)" does not always mean only "specifically designed to" by hardware. Alternatively, the expression "apparatus configured to" may mean that the apparatus "can" operate together with another apparatus or component. For example, the phrase "a processor configured (or set) to perform A, B, and C" may be a generic-purpose processor (such as a central processing unit (CPU) or an application processor (AP)) that can perform a corresponding operation by executing at least one software program stored at an exclusive processor (such as an embedded processor) for performing a corresponding operation, or stored at a memory device.

Terms defined herein are only used to describe a specific embodiment, and are not intended to limit the scope of other embodiments. A singular form may include a plurality of forms unless it is explicitly differently represented. Technical and scientific terms used herein may have the same meanings as those generally understood by a person of common skill in the art. Generally used terms that are defined in a dictionary have the same meanings as or similar meanings to those of a context of related technology, and are not to be analyzed as an ideal or excessively formal meaning unless explicitly defined. In some cases, terms defined herein cannot be analyzed to exclude the embodiments of the present disclosure.

Hereinafter, with reference to the accompanying drawings, a communication device and a UE are described according to embodiments of the present disclosure. Herein, the term "user" may indicate a person who uses a communication device, a device or an apparatus using a communication device (e.g., an artificial intelligence device), a person who uses the UE, or a device or an apparatus using the UE.

Figure 1A:
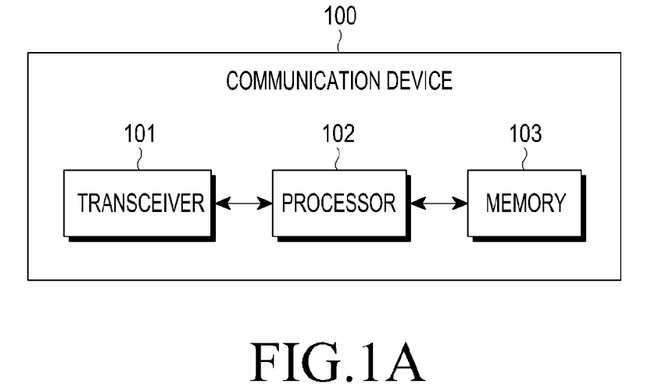
FIG. 1A is a diagram illustrating a communication device, according to an embodiment of the present disclosure.

Referring to FIG. 1A, a diagram illustrates a communication device, according to an embodiment of the present disclosure. A communication device 100 includes a transceiver 101, a processor 102, and a memory 103.

Figure 1B:
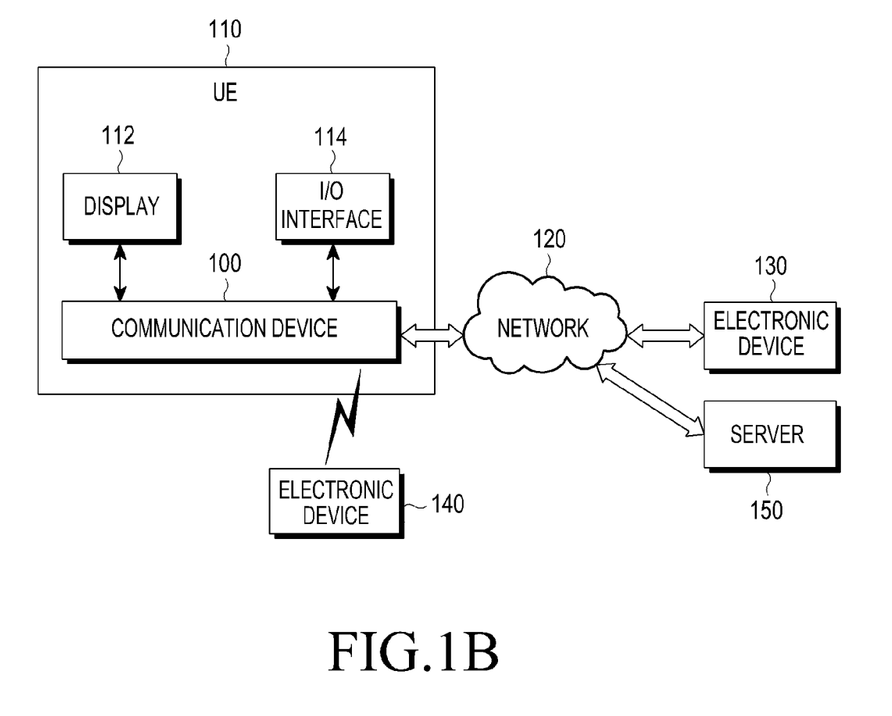
FIG. 1B is a diagram illustrating a UE equipped with a communication device, according to an embodiment of the present disclosure.

The transceiver 101 configures communication between the communication device 100 and an external device (e.g., a first external electronic device 130, a second external electronic device 140, or a server 150 of FIG. 1B). For example, the transceiver 101 may be connected to a network 120 of FIG. 1B through wired or wireless communication to communicate with the external device. According to an embodiment, the term "transceiver" may be interchangeably used with various terms such as, for example, "communication module" or "communication interface".

Wireless communication may be performed using at least one of LTE, LTE-advanced (LTE-A), code division multiple access (CDMA), wideband CDMA (WCDMA), a universal mobile telecommunications system (UMTS), wireless broadband (WiBro), and a global system for mobile communications (GSM). Wireless communication may include, for example, short-range communication. Short-range communication may include, for example, at least one of wireless fidelity (WiFi), Bluetooth, near field communication (NFC), and a global navigation satellite system (GNSS). The GNSS may include at least one of a GPS, a global navigation satellite system (Glonass), a Beidou navigation satellite system (Beidou), and Galileo, the European global satellite-based navigation system, depending on a use area or a bandwidth.

Wired communication may include at least one of a universal serial bus (USB), a high definition multimedia interface (HDMI), a recommended standard-232 (RS-232), and a plain old telephone service (POTS). The network 120 of FIG. 1B may include a telecommunications network such as at least one of a computer network (e.g., a local area network (LAN) or a wide area network (WAN)), Internet, and a telephone network.

The processor 102 may include a communication processor (CP). According to an embodiment of the present disclosure, the processor 102 may further include one or more of a CPU and an AP. The processor 102 performs an operation or data processing associated with control of and/or communication with at least one other element of the communication device 100. The term "processor" may be interchangeably used with various other terms such as, for example, "control module", "control unit", and "controller".

The memory 103 may include a volatile memory and/or a non-volatile memory. The memory 103 stores a command or data related to at least one other element of the communication device 100. According to an embodiment of the present disclosure, the memory 103 stores software and/or a program. The program may include kernel, middleware, an application programming interface (API), and/or an application program (an "application"). Although the memory 103 is included in the communication device 100 in FIG. 1A, the memory 103 may be omitted during manufacturing of the communication device 100.

FIG. 1B is a diagram illustrating a UE equipped with a communication device, according to an embodiment of the present disclosure.

Referring to FIG. 1B, a UE 110 includes the communication device 100, a display 112, and an input/output (I/O) interface 114.

The display 112 may include at least one of a liquid crystal display (LCD), a light-emitting diode (LED) display, an organic light-emitting diode (OLED) display, a microelectromechanical system (MEMS) display, and an electronic paper display. The display 112 displays various types of content (e.g., text, an image, a video, an icon, a symbol, etc.) to a user. The display 112 may include a touch screen and may receive a touch, a gesture, an approach, or a hovering input by using an electronic pen or a user's body part.

The I/O interface 114 is capable of delivering a command or data that input from a user or another external device to one or more other elements of the UE 110. The I/O interface 114 outputs a command or data received from one or more other elements of the UE 110 to the user or one or more external devices.

Figure 1C:
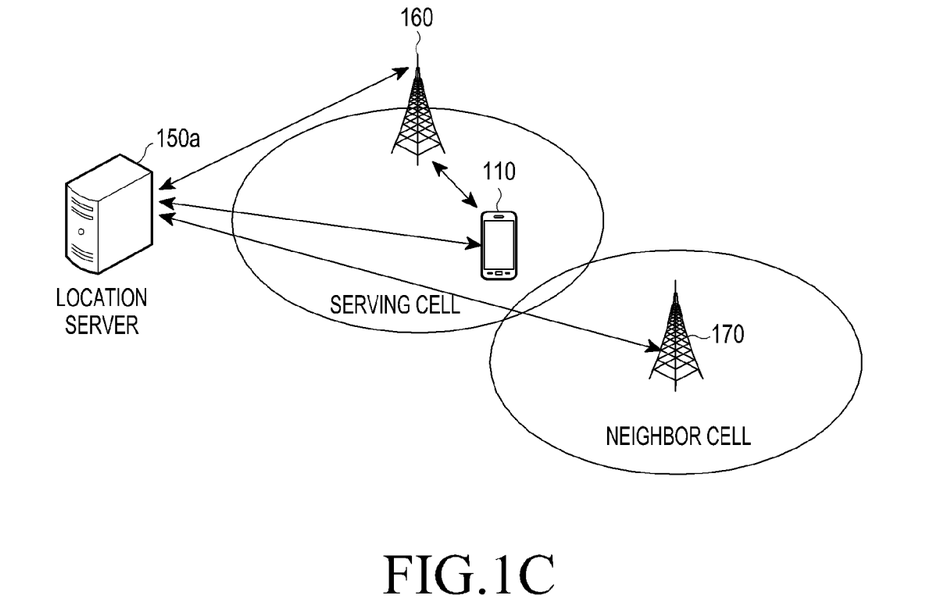
FIG. 1C is a diagram illustrating a communication system, according to an embodiment of the present disclosure.

FIG. 1C is a diagram illustrating a communication system, according to an embodiment of the present disclosure.

Referring to FIG. 1C, a communication system includes a serving base station 160, a neighbor base station 170, the UE 110, and a location server 150a, which is connected to the base stations 160 and 170 and the UE 110.

The base stations 160 and 170 provide a communication service to a particular geographic area (i.e., a cell). The base stations 160 and 170 may also be referred to as an evolved NodeB (eNB), an access point, and a base transceiver system (BTS).

The UE 110 may be included in a serving cell, and the serving base station 160 provides a communication service for the serving cell. A neighbor cell is adjacent to the serving cell, and the neighbor base station 170 provides a communication service for the neighbor cell.

The location server 150a is connected with the UE 110 and the base stations 160 and 170. For example, in an LTE system, the location server 150a and the UE 110 may be connected through an LTE positioning protocol (LPP), and the location server 150a and the base stations 160 and 170 may be connected through an LPP annex. The location server 150a may also be referred to as an enhanced serving mobile location center (E-SMLC) in the LTE system, and may receive information about a reference signal time difference (RSTD) from the UE 110 through the LTE positioning protocol. The location server 150a estimates a location of the UE 110 based on the received RSTD information, and transmits the estimated location to the base stations 160 and 170. The location server 150a transmits assistance data to the UE 110. The assistance data may include assistance data about the serving cell and assistance data about the neighbor cell. The assistance data about the serving cell may include at least one of a bandwidth for a positioning reference signal (PRS), a PRS configuration index, and a number of consecutive downlink subframes (NPRS). The assistance data about the neighbor cell may include at least one of physical cell identification (PCI) information for the neighbor cell, a timing offset, a normal or an extended cyclic prefix (CP), an antenna port configuration, and a slot number offset.

Figure 2:
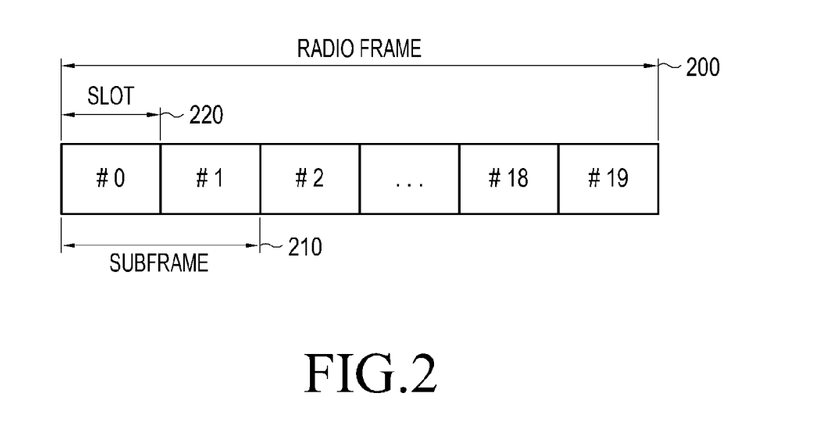
FIG. 2 is a diagram illustrating a structure of a radio frame in long term evolution (LTE)

FIG. 2 is a diagram illustrating a structure of a radio frame in an LTE system.

Referring to FIG. 2, a radio frame 200 includes 10 subframes 210, each of which includes two slots 220. For example, a length of one radio frame may be 10 ms, a length of one subframe may be 1 ms, and a length of one slot may be 0.5 ms.

Figure 3A:
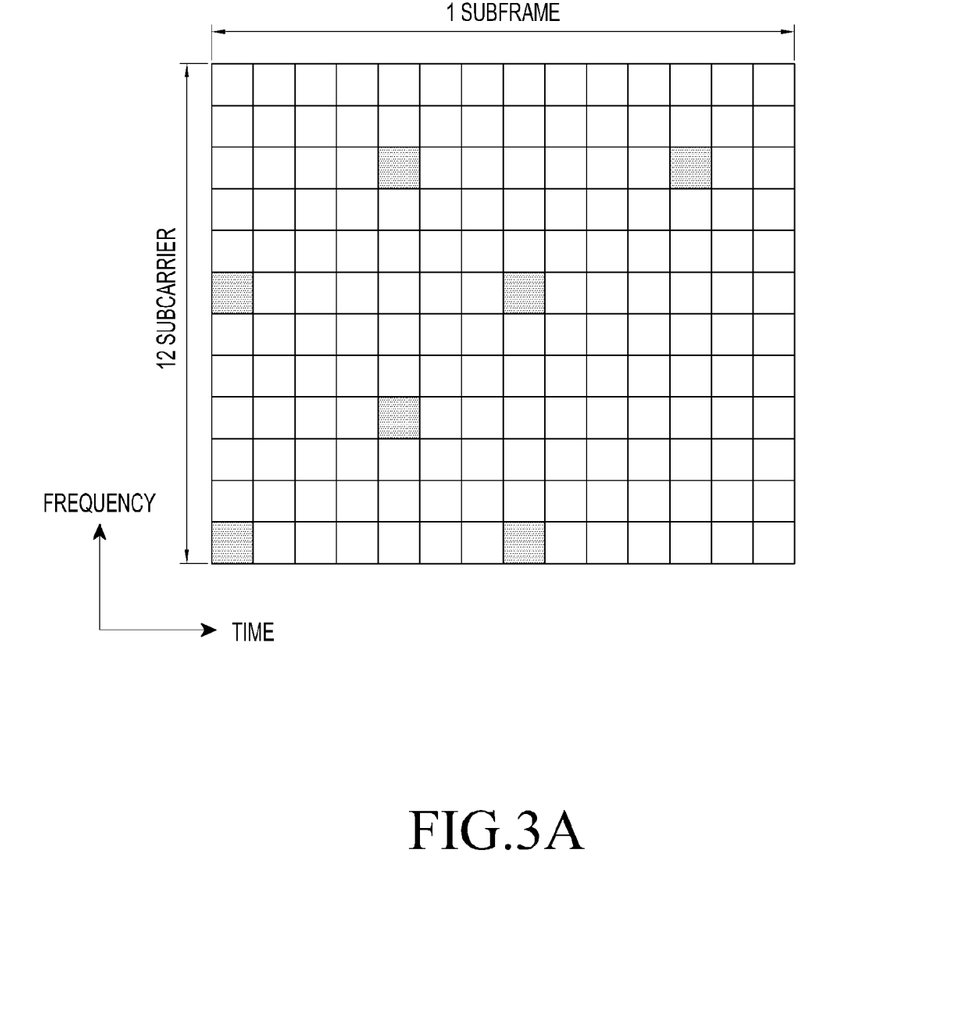
FIG. 3A is a diagram illustrating a pattern of a CRS mapped to a resource block.
Figure 3B:
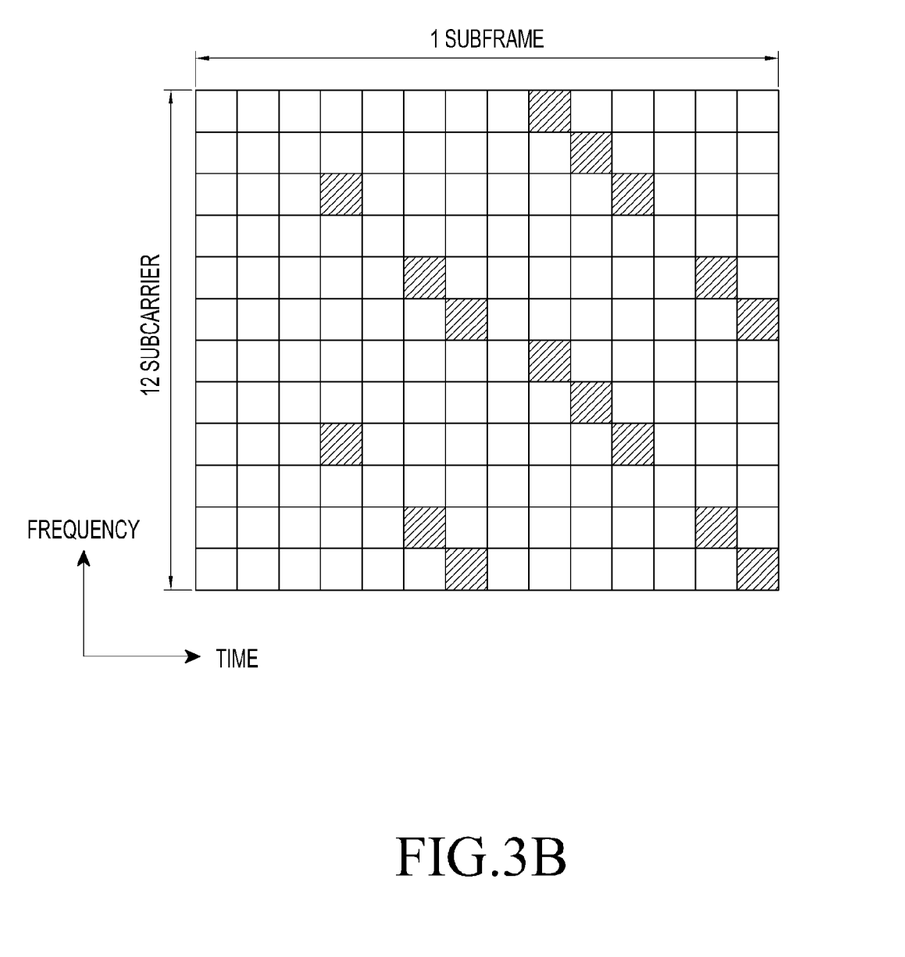
FIG. 3B is a diagram illustrating a pattern of a PRS mapped to a resource block.

FIG. 3A is a diagram illustrating a pattern of a CRS mapped to a resource block, and FIG. 3B is a diagram illustrating a pattern of a PRS mapped to a resource block.

Examples of a downlink reference signal include a CRS, a UE-specific RS, a PRS, a multimedia broadcast and multicast single frequency network (MBSFN) RS, and a channel state information (CSI)-RS. For example, the CRS and the PRS may be mapped to a resource element (RE), as illustrated in FIGS. 3A and 3B. The CRS may be sent to a UE (e.g., the UE 110), for example, in a transmission period of 5 ms, and the PRS may be sent to the UE 110, for example, in a transmission period of 160 ms.

Figure 4:
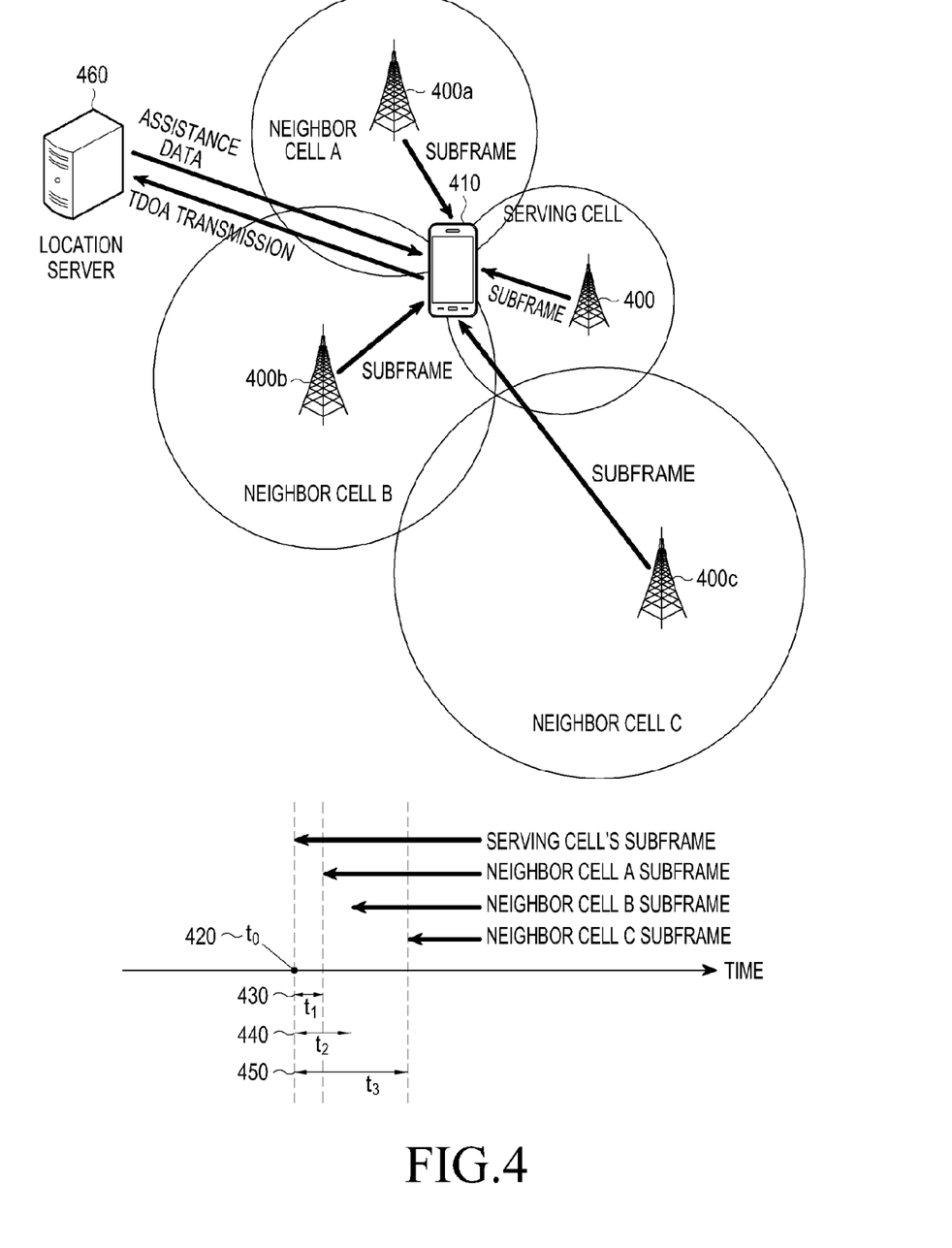
FIG. 4 is a diagram illustrating an operation or a function of measuring a TDOA, according to an embodiment of the present disclosure.

FIG. 4 is a diagram illustrating an operation or a function of measuring a TDOA, according to an embodiment of the present disclosure.

The transceiver 101 receives subframes, including at least one of the CRS, the PRS, and the synchronization signal, from a serving cell base station 400 (which may be referred to as a "serving cell"), a neighbor cell A base station 400a (which may be referred to as a "neighbor cell A"), a neighbor cell B base station 400b (which may be referred to as a "neighbor cell B"), and a neighbor cell C base station 400c (which may be referred to as a "neighbor cell C"). When subframes are received, the processor 102 determines a time at which a subframe is received from the serving cell base station 400 as a reference time to 420. The processor 102 calculates a TDOA $t_1$ 430 between the reference time 420 and a time at which a subframe is received from the neighbor cell A base station 400a. The processor 102 calculates a TDOA $t_2$ 440 between the reference time 420 and a time at which a subframe is received from the neighbor cell B base station 400b. The processor 102 calculates a TDOA $t_3$ 450 between the reference time 420 and a time at which a subframe is received from the neighbor cell C base station 400c. The processor 102 calculates a first arrival path (FAP) for the received subframe to measure a TDOA. The processor 102 measures the TDOA based on the calculated FAP. The TDOA may include a time difference between at least one of the CRS, the PRS, and the synchronization signal received by the transceiver 101 from the respective base stations 400, 400a, 400b, and 400c.

Figure 5:
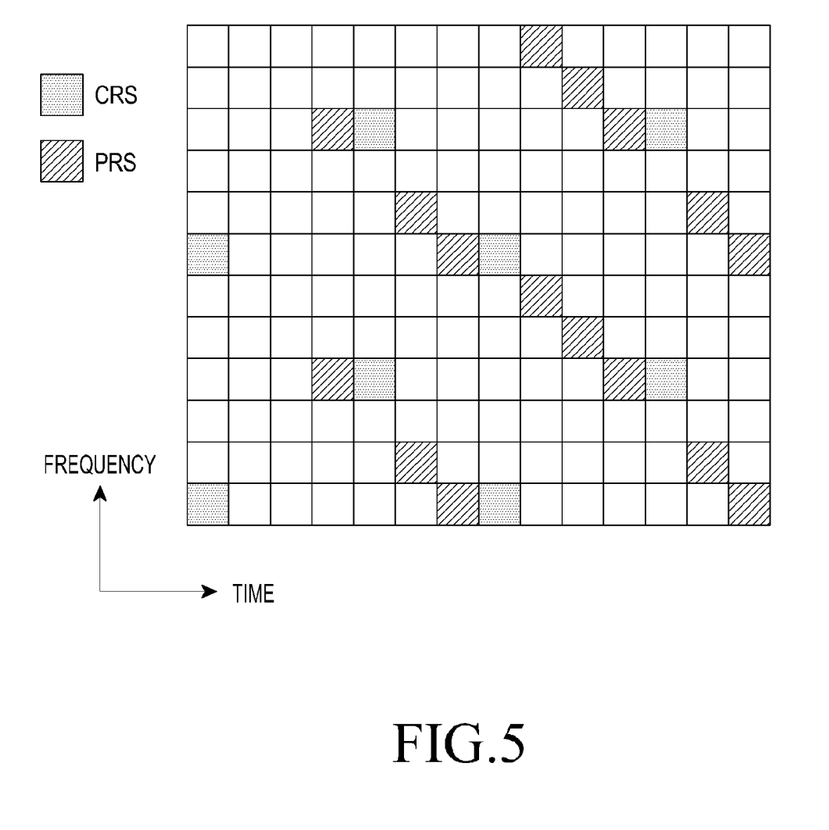
FIG. 5 is a diagram illustrating a pattern of a signal in which a CRS and a PRS are combined, according to an embodiment of the present disclosure.
Figure 6:
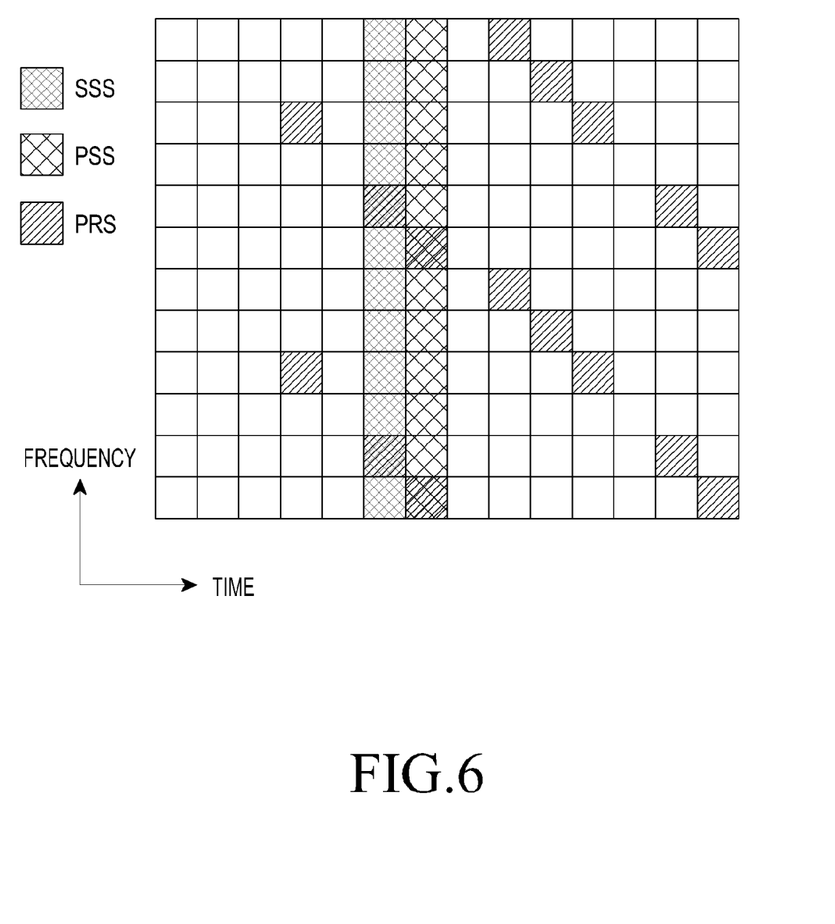
FIG. 6 is a diagram illustrating a pattern of a signal in which a synchronization signal and a PRS are combined, according to an embodiment of the present disclosure.

According to an embodiment of the present disclosure, when measuring the TDOA, the processor 102 measures the TDOA based on any one signal (e.g., the CRS) that is designated in advance among a plurality of signals received from the plurality of base stations 400, 400a, 400b, and 400c. If the PRS is received during measurement of the TDOA based on any one signal (e.g., the CRS) that is designated in advance, the processor 102 may measure the TDOA based on the PRS. If the PRS is received during measurement of the TDOA based on any one signal (e.g., the CRS) that is designated in advance, the processor 102 may measure the TDOA based on the signal designated in advance and the PRS. Alternatively, as described in FIGS. 5 and 6, the processor 102 may measure the TDOA based on a signal obtained by combining the PRS with the CRS (FIG. 5) or by combining the PRS with the synchronization signal (FIG. 6). More specifically, the PRS and the CRS may be included in a subframe as described in FIG. 5 and the TDOA may be measured based on a signal comprising the subframe including the PRS and the CRS. Otherwise, the PRS and the synchronization signal, which may comprise the PSS and the SSS. may be in included in a subframe as described in FIG. 6 and the TDOA may be measured based on a signal comprising the subframe including the PRS and the synchronization signal. In this case, the processor 102 measures the TDOA based on respective signals or one of them included in the obtained signal. Embodiments of the present disclosure provide examples of ways to measure the TDOA, and the present disclosure is not limited to these embodiments. Although three cells are illustrated as neighbor cells in FIG. 4, the present disclosure is not limited by the configuration of FIG. 4.

The processor 102 controls the transceiver 101 to transmit information about the respective measured TDOAs to a location server 460. The processor 102 may control the transceiver 101 to transmit the respective measured TDOAs to the location server 460. The processor 102 may control the transceiver 101 to transmit only some of the measured TDOAs to the location server 460. For example, the transceiver 101 may transmit measured TDOAs for some cells (e.g., cells having received power strengths exceeding a preset threshold value) determined according to a strength of received power (e.g., a reference signal received power (RSRP), a received signal strength indication (RSSI), or a reference signal received quality (RSRQ)) measured based on the received CRS.

According to an embodiment of the present disclosure, the location server 460 estimates a location of a UE 410 based on the TDOA information transmitted from the UE 410. The location server 460 may estimate the location of the UE 410 based on one of a TDOA measured based on the CRS, a TDOA measured based on the PRS, and a TDOA measured based on the synchronization signal according to preset priorities. If measured TDOAs according a plurality of signal types are received, the location server 460 measures a location of the UE 410 by using an average value of the TDOAs. For example, if the location server 460 receives both a TDOA $t_1$ between the serving cell and the neighbor cell A measured based on the CRS, and a TDOA $t_{1'}$ between the serving cell and the neighbor cell A measured based on the PRS, the location server 460 estimates the location of the UE 410 based on an average value (that is, $(t_1+t_{1'})/2$) of the TDOA $t_1$ and the TDOA $t_{1'}$. Embodiments provide examples of ways to estimate the location of the UE 410 by the location server 420, and it would be obvious to those of ordinary skill in the art that the present disclosure is not limited thereto.

As described above, by estimating the location of the UE 410 based on various signals, such as a CRS and a synchronization signal having shorter transmission periods than that of a PRS, the location of the UE 410 may be estimated a greater number of times than with conventional techniques, thereby performing location estimation with enhanced reliability or accuracy.

The processor 102 controls the transceiver 101 to receive device control information based on the estimated current location of the UE 410, e.g., information about priorities for processing signals sent from the neighbor base stations 400a, 400b, and 400c, from the serving cell base station 400. According to an embodiment of the present disclosure, through enhanced reliability or accuracy location estimation, an error between a current location value of the UE 410 known to the base station 400 and an actual location value of the UE 410 may be reduced, such that device control information accurately reflecting the real location of the UE 410 may be provided to the UE 410. If the priorities are designated in advance, the priorities may be changed by, for example, the serving cell base station 400, according to the estimated location of the UE 410 and uplink control information (UCI) transmitted by the UE 410 to the serving cell base station 400.

Herein, the CRS, the PRS, and the synchronization signal have been described as examples for estimating locations of the UEs 110 and 410. However, various other signals that are sent from base stations (e.g., the base stations 400, 400a, 400b, and 400c) may be used in addition to or in place of the CRS and the synchronization signal.

Figure 7:
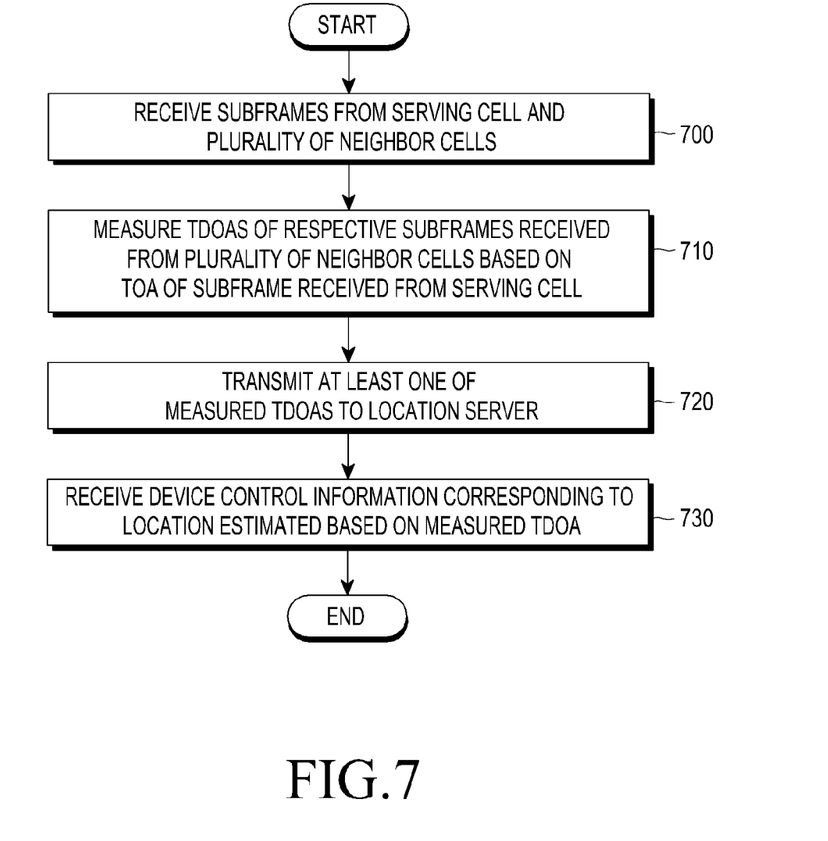
FIG. 7 is a flowchart illustrating a method for controlling a communication device, according to an embodiment of the present disclosure.

FIG. 7 is a flowchart illustrating a method for controlling the communication device, according to an embodiment of the present disclosure.

Referring to FIG. 7, the communication device receives subframes from a serving cell and a plurality of neighbor cells, in step 700.

The communication device measures TDOAs of the respective subframes received from the plurality of neighbor cells based on a TOA of the subframe received from the serving cell, in step 710.

The communication device transmits at least one of the measured TDOAs to a location server, in step 720.

The communication device receives device control information corresponding to a location estimated based on the measured TDOA from the location server.

A term "module", as used herein, may refer to a unit including one of or a combination of two or more of hardware, software, and firmware. The term "module" may be interchangeably used with the terms "unit," "logic," "logical block," "component," and "circuit." A module may be a minimum unit or a portion of an integrated component. A module may be a minimum unit or a portion thereof performing one or more functions. A module may be implemented mechanically or electronically. For example, a module may include at least one of an application-specific integrated circuit (ASIC) chip, field-programmable gate arrays (FPGAs), and a programmable-logic device performing certain operations already known or to be developed.

At least a part of a device (for example, modules or functions thereof) or a method (for example, operations), according to an embodiment of the present disclosure, may be implemented with a command stored in a computer-readable storage medium in the form of a programming module. When the command is executed by a processor (for example, the processor 102 of FIG. 1A), the one or more processors may perform a function corresponding to the command. The computer-readable storage medium may be, for example, the memory 103 of FIG. 1A.

The computer readable recording medium may include a hard disk, a floppy disk, magnetic media (e.g., magnetic tape), optical media (e.g., a compact disc read only memory (CD-ROM) or a digital versatile disc (DVD)), magneto-optical media (e.g., a floptical disk), and a hardware device (e.g., a read only memory (ROM), a random access memory (RAM), or a flash memory). Further, the program instructions may include a machine language code created by a complier and a high-level language code executable by a computer using an interpreter. The foregoing hardware device may be configured to be operated as at least one software module to perform an operation of the present disclosure, or vice versa.

Modules or programming modules, according to embodiments of the present disclosure, may include one or more of the foregoing elements, may have some of the foregoing elements omitted, or may include additional elements. Operations performed by the modules, the programming modules, or other elements may be executed in a sequential, parallel, repetitive, or heuristic manner. Also, some of the operations may be executed in a different order, may be omitted, or may include additional operations. Embodiments disclosed herein are provided to assist in the understanding of disclosed technical matters, and are not intended to limit the scope of the technology described herein. Thus, the scope of the present disclosure should be construed as including any change or various other embodiments based on the technical spirit of the present disclosure.

The present disclosure may be utilized in conjunction with the manufacture of integrated circuits, chip sets, or system-on-chips (SoCs). One skilled in the art would know how to dice wafers and package die to produce integrated circuits. Integrated circuits so manufactured are considered part of this disclosure.

As is apparent from the foregoing description, according to embodiments of the present disclosure, when the location of the UE is estimated, a TDOA is measured using not only the PRS, but also signals having shorter transmission periods than that of the PRS, e.g., the CRS and the synchronization signal, thereby performing high-reliability location estimation when compared to conventional techniques.

While the disclosure has been shown and described with reference to certain embodiments thereof, it will be understood by those skilled in the art that various changes in form and detail may be made therein without departing from the spirit and scope of the disclosure as defined by the appended claims.

What is claimed is:

1. A communication device comprising:
a transceiver;
a memory electrically connected with the transceiver; and
a processor electrically connected with the transceiver and the memory,
wherein the processor is configured to:
receive a first subframe from a serving cell and a plurality of subframes from a plurality of neighbor cells;
measure a respective time difference of arrival (TDOA) for each of the plurality of subframes based on a time of arrival (TOA) of the first subframe; and
transmit at least one of the measured TDOAs to a location server,
wherein the respective TDOAs are measured based on at least one of a cell-specific reference signal (CRS) and a synchronization signal in the plurality of subframes, and
wherein the at least one of the measured TDOAs is determined according to a strength of received power measured based on the CRS.

2. The communication device of claim 1, wherein the plurality of subframes further comprise a positioning reference signal (PRS).

3. The communication device of claim 2, wherein the processor is further configured to combine the PRS and the at least one of the CRS and the synchronization signal and to measure the respective TDOAs based on a signal obtained by combining the PRS and the at least one of the CRS and the synchronization signal.

4. The communication device of claim 2, wherein the processor is further configured to measure the respective TDOAs for the PRS and the at least one of the CRS and the synchronization signal.

5. The communication device of claim 1, wherein the processor is further configured to control the transceiver to receive assistance data from the location server.

6. The communication device of claim 1, wherein the processor is further configured to control the transceiver to receive, from a base station, information about cell priorities determined based on a location of the communication device that is estimated based on the TDOAs.

7. A method for controlling a communication device, the method comprising:
receiving a first subframe from a serving cell and a plurality of subframes from a plurality of neighbor cells;
measuring a respective time difference of arrival (TDOA) for each of the plurality of subframes based on a time of arrival (TOA) of the first subframe; and
transmitting at least one of the measured TDOAs to a location server,
wherein the respective TDOAs are measured based on at least one of a cell-specific reference signal (CRS) and a synchronization signal in the plurality of subframes, and
wherein the at least one of the measured TDOAs is determined according to a strength of received power measured based on the CRS.

8. The method of claim 7, wherein the plurality of subframes further comprise a positioning reference signal (PRS).

9. The method of claim 8, wherein measuring the respective TDOAs comprises combining the PRS and the at least one of the CRS and the synchronization signal and measuring the TDOAs of the respective subframes based on a signal obtained by combining the PRS and the at least one of the CRS and the synchronization signal.

10. The method of claim 8, wherein measuring the respective TDOAs comprises measuring the respective TDOAs for the PRS and the at least one of the CRS and the synchronization signal.

11. The method of claim 7, further comprising receiving assistance data from the location server.

12. The method of claim 7, further comprising receiving, from a base station, information about cell priorities determined based on a location of the communication device that is estimated based on the TDOAs.

13. A chipset configured to:
receive a first subframe from a serving cell and a plurality of subframes from a plurality of neighbor cells;
measure a respective time difference of arrival (TDOA) for each of the plurality of subframes based on a time of arrival (TOA) of the first subframe; and
transmit at least one of the measured TDOAs to a location server, wherein the respective TDOAs are measured based on at least one of a cell-specific reference signal (CRS) and a synchronization signal in the plurality of subframes, and wherein the at least one of the measured TDOAs is determined according to a strength of received power measured based on the CRS.

14. The chipset of claim 13, wherein the plurality of subframes further comprise a positioning reference signal (PRS).

15. The chipset of claim 14, wherein the chipset is further configured to combine the PRS and the at least one of the CRS and the synchronization signal, and to measure the respective TDOAs based on a signal obtained by combining the PRS and the at least one of the CRS and the synchronization signal.

16. The chipset of claim 14, wherein the chipset is further configured to measure the respective TDOAs for the PRS and the at least one of the CRS and the synchronization signal.

17. The chipset of claim 13, wherein the chipset is further configured to receive assistance data from the location server.

18. A chipset for communication, configured to:
receive a first subframe from a serving cell and a plurality of subframes from a plurality of neighbor cells;
measure a respective time difference of arrival (TDOA) for each of the plurality of subframes based on a time of arrival (TOA) of the first subframe; and
transmit at least one of the measured TDOAs to a location server, wherein the respective TDOAs are measured based on at least one of a cell-specific reference signal (CRS) and a synchronization signal, and wherein the at least one of the measured TDOAs is determined according to a strength of received power measured based on the CRS.

19. A method for controlling a communication device, the method comprising:
receiving, at a transceiver of the communication device, a first subframe from a serving cell;
receiving, at the transceiver, a second subframe from a neighbor cell;
receiving, at the transceiver, a third subframe from a second neighbor cell;
measuring, at the processor, of the commnunication device, a first time difference of arrival (TDOA) between a first time of arrival (TOA) of the first subframe and a second TOA of the second subframe;
measuring, at the processor, a second TDOA between the first TOA and a third TOA of the third subframe; and
transmitting, by the transceiver, at least one of the first TDOA and the second TDOA to a location server, wherein the first TDOA and the second TDOA are measured based on at least one of a cell-specific signal (CRS) and a synchronization signal in one or more of the first, second, and third subframes, and wherein the at least one of the measured TDOAs is determined according to a strength of the received power measured based on the CRS.

* * * * *

UNITED STATES PATENT AND TRADEMARK OFFICE
CERTIFICATE OF CORRECTION

PATENT NO. : 9,720,070 B2
APPLICATION NO. : 15/221223
DATED : August 1, 2017
INVENTOR(S) : Jin-Won Choi et al.

Page 1 of 1

It is certified that error appears in the above-identified patent and that said Letters Patent is hereby corrected as shown below:

In the Claims

Column 12, Claim 19, Line 18:
"sured based on at least one of a cell-specific signal"
Should be:
-- sured based on at least one of a cell-specific reference signal --

Column 12, Claim 19, Line 28:
"determined according to a strength of the received"
Should be:
-- determined according to a strength of received --

Signed and Sealed this
Fifth Day of June, 2018

Andrei Iancu
*Director of the United States Patent and Trademark Office*